Patented Sept. 6, 1949

2,481,434

UNITED STATES PATENT OFFICE 2,481,434

CYCLIC AMINOBENZALDEHYDE ACETALS OF 1,2- AND 1,3-GLYCOLS OF TWO TO FOUR CARBON ATOMS

David M. McQueen and David W. Woodward, Wilmington, Del., assignors to E. I. du Pont de Nemours & Company, Wilmington, Del., a corporation of Delaware No Drawing. Application December 28, 1946, Serial No. 719,110

6 Claims. (Cl. 260—338)

This invention relates to cyclic aminobenzaldehyde acetals of 1,2- and 1,3-glycols and to their preparation.

An object of this invention is to provide a new class of organic compounds. Another object is to provide a new class of aminobenzaldehyde acetals which are useful in the preparation of polymeric color formers. A further object is to provide new intermediates which can be used to prepare polyvinyl acetal color formers in a more efficient manner. Still other objects will appear from the following description of the invention.

The novel cyclic aminobenzaldehyde acetals of 1,2- and 1,3-glycols of 2 to 4 carbon atoms of this invention can be advantageously prepared by catalytically reducing the corresponding cyclic acetals of nitrobenzaldehydes with hydrogen at elevated temperatures and pressures, e. g., 50° to 100° C. and 100 to 2000 pounds per square inch. The resulting aminobenzaldehyde acetals are then recovered in a pure state by distillation under reduced pressure in the presence of at least 0.0025 mol equivalent of a non-volatile alkali.

The cyclic nitrobenzaldehyde acetals just described which are used in the preparation of the cyclic aminobenzaldehyde acetals can be made by reacting a nitrobenzaldehyde with a 1,2- or 1,3-glycol of 2 to 4 carbon atoms under acetal-forming conditions. This may be accomplished by acetalization of a nitrobenzaldehyde by removal of water from an acid catalyzed mixture of a nitrobenzaldehyde, 1,2-ethylene glycol or 1,3-propylene glycol, etc. and a water-immiscible, high-boiling liquid, e. g., benzene, toluene, xylene, chlorobenzene, etc., as a water-entraining solvent. Suitable catalysts include phosphoric, sulfuric, hydrochloric, and p-toluene-sulfonic acids.

The invention is not limited to the unsubstituted cyclic aminobenzaldehyde acetals of 1,2- and 1,3-glycols of 2 to 4 carbon atoms. On the contrary, the benzene nucleus may be substituted by monovalent hydrocarbon (R) radicals or hydrocarbon ether (RO-) radicals, e. g., methyl, ethyl, phenyl, naphthyl; methoxy, ethoxy, etc. The lower alkyl and alkyl ether substituted derivatives are the most important. The compounds are normally prepared from the corresponding nitrobenzaldehydes. While any nitrobenzaldehyde, e. g., the ortho, meta, or para isomers, may be used in the preparation of the cyclic acetals, it is preferred to use meta-nitrobenzaldehydes because (1) they are readily available by nitration of benzaldehydes, (2) they are more stable and form more stable derivatives than do the ortho isomers, and (3) their acetals give better yields on reduction than do the ortho and para isomers.

Catalytic reduction of the nitrobenzaldehyde acetals is best accomplished by rapid agitation of a suspension of the catalyst in the nitro body in the presence of hydrogen at pressures below 2000 pounds per square inch and at temperatures in the range of 50° to 100° C. and preferably between 70° and 90° C. The hydrogenation reaction is continued until the nitro group is reduced to an amino group. It is important that the temperature be maintained in this region since at higher temperatures hydrogenolysis of the acetal group occurs and instead of acetals of aminobenzaldehydes the products are toluidines. At temperatures below 50° C. the reaction is extremely slow or fails to go at all. As an aid in controlling the temperature and moderating the reaction, solvents, such as alcohols, ethers, and hydrocarbons, may be added to the reaction mixture. The catalysts are preferably used in the ratio of between 1 and 10 parts per 100 parts of the nitroacetals. The completion of the reduction of the nitro group is marked by a sudden decrease in the rate of absorption of hydrogen. At this point, the reaction mixture is cooled and the pressure released to prevent further reaction.

The acetals of aminobenzaldehydes prepared by the above reduction method are of good quality but are unstable, especially when heated. It has been found that they may be heated for prolonged periods or distilled without decomposition if they are stabilized by the addition of a non-volatile alkali. The minimum amount of alkali is at least 0.0025 mol equivalent per mol of amino acetal and it is preferred that at least 0.005 mol equivalent be used. With this amount of stabilizer, no appreciable decomposition occurs even when the mixture is heated to 150° C. for several hours. Larger amounts, for example, up to 0.025 mol equivalent or more can, of course, be used, while with smaller amounts decomposition will occur. The decomposition occurs through loss of alcohol with resultant formation of an aldehyde-amine resin. Many nonvolatile alkalis may be used. These include the alkali metal hydroxides, alkoxides and carbonates, amides, etc., the alkaline earth hydroxides and organic tertiary or quaternary nitrogen bases stable at temperatures below 200° C. and having vapor pressures of 1 mm. or lower at 150° C. or above, e. g., dimethyloctadecylamine, tetramethyl ammonium hydroxide, etc.

The following examples further illustrate the invention. All temperatures are centigrade, pressures in millimeters of mercury, and all parts are by weight.

Example I

Into a stainless steel reaction vessel equipped for cooling and heating, having means for agitation, and fitted for vacuum distillation are charged 86 parts of recrystallized m-nitrobenzaldehyde having a melting range of 55°–57°, 38.3 parts of ethylene glycol, 86 parts of xylene, and 0.17 part of phosphoric acid. The vessel is closed and heated, with agitation, rapidly to 120°, then more slowly to 160°. During this time about 10 parts of water and 56 parts of xylene are removed by distillation. Heating is discontinued and the internal pressure gradually reduced to 100 mm. to remove the residual water and xylene. To the residue in the kettle are added 100 parts of ethanol and 0.105 part of sodium hydroxide. The temperature is adjusted to 70° and the solution filtered into a stainless steel crystallizing vessel. While agitating the solution, its temperature is lowered to 5° and, after crystallization is complete, the mixture is filtered and air-dried to yield 105 parts (95% based on the nitroaldehyde) of m-nitrobenzaldehyde ethylene glycol acetal having a melting range of 56°–58°.

A hot solution of 134 parts of the above nitroacetal and 7 parts of a nickel-on-kieselguhr catalyst in 134 parts of methanol is charged to a hydrogenation autoclave and the temperature adjusted to 50°. After sweeping out the air with hydrogen, the hydrogen pressure is increased to 300 pounds and agitation started. The temperature rises to 80° and is held there by cooling. The reduction is carried out at a hydrogen pressure of 300 to 500 pounds per square inch. The rapid absorption of hydrogen falls off sharply after the theoretical amount required to reduce the nitro group has been used. At this point the reduction is stopped by cooling to 40° and releasing the hydrogen pressure. The charge is filtered and 0.42 part of sodium hydroxide is added. This stabilized, alcoholic solution of m-aminobenzaldehyde ethylene glycol acetal is placed in a stainless steel still having a porcelain ring-packed column. The charge is heated to distill methanol until the internal temperature reaches 100°, at which point vacuum is applied until the internal pressure is reduced to 5 mm. The temperature is then increased slowly until distillation occurs. The product, m-aminobenzaldehyde ethylene glycol acetal, boils in the range of 155°–160° C. at 5 mm. and has the formula:

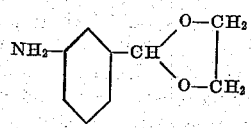

The total yield is 103 parts or 91% based on the nitroacetal. Analysis shows a composition of C=66.10, 66.27; H=6.56, 6.53; N=8.08, 7.96 as compared with a calculated value for $C_9H_{11}O_2N$ of C=65.50%; H=6.56%; and N=8.5. Additional boiling points of this compound are as follows: 131°/0.4 mm., 138°/1.10 mm., 142°/1.5 mm., 145°/2.0 mm., and 158°/6.0 mm. Physical constants determined for this compound are:

$n_D^{25}$—1.587

$n_{25}^{25}$—1.199

$M_D$—Found: 45.75; calculated 45.64

Example II

Using an equal weight of p-nitrobenzaldehyde in the procedure of Example I, a 90% yield of p-nitrobenzaldehyde ethylene glycol acetal having a melting point of 89°–90° C. is obtained. This in turn is hydrogenated and distilled by the procedure of said example to yield p-aminobenzaldehyde ethylene glycol acetal having a boiling point of 150° at 1 mm. and the formula:

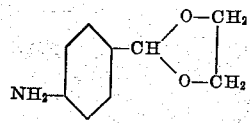

Analysis: calculated for $C_9H_{11}O_2N$: C=65.5%; H=6.56%; found: C=65.3%; H=6.85%.

Example III

In a reaction vessel fitted with a short distillation column is placed 151 parts of m-nitrobenzaldehyde, 150 parts of xylene, 1 part of 5% phosphoric acid, and 84 parts of trimethylene glycol. The mixture is stirred and heated until no distillation occurs at an internal temperature of 150°, then the pressure is reduced until no distillation occurs at a pressure of 50 mm. and a temperature of 110°. The mixture is added to 320 parts of ethanol containing 2 parts of sodium hydroxide and filtered at 60°. On cooling, pale yellow crystals are formed which when dried melt at 58–60°. Analysis: calculated for $C_{10}H_{11}O_4N$: N=6.7; found: N=6.9. This acetal is reduced to the corresponding amino acetal and distilled as in Example I to give a 90% yield of m-aminobenzaldehyde trimethylene glycol acetal, a low-melting solid with a melting point of 73° to 76°, a boiling point of 141° at 1.5 mm. and a formula:

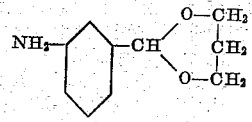

Analysis: calculated for $C_{10}H_{13}O_2N$: C=67.0; H=7.26; N=7.82; found: C=66.95%; H=7.21%; N=7.6%.

Example IV

Following the procedure of Example I and replacing the b-nitrobenzaldehyde with 103 parts of 3-nitro-4-methoxy-benzaldehyde, the corresponding ethylene glycol acetal melting at 48°–53° is obtained. Analysis: calculated for $C_{10}H_{11}O_5N$: N=6.23; found: N=6.54. Following the reduction and distillation procedure of Example I, a 90% yield of 3-amino-4-methoxy-benzaldehyde ethylene glycol acetal boiling at 173° at 5 mm. and 146° at 1 mm. and the formula:

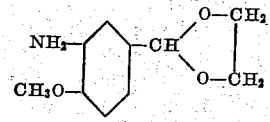

is obtained. Analysis: calculated for $C_{10}H_{13}O_3N$: C=61.5; H=6.66; N=7.18; found: C=61.49; H=6.82; N=7.11.

Example V

Following the procedure of Example I using 94 parts of 3-nitro-p-tolualdehyde in place of the m-nitrobenzaldehyde, there is obtained in 95% yield the corresponding acetal melting at 44°. Analysis: calculated for $C_{10}H_{11}O_4N$: $N=6.7$; found: $N=6.9$. On reduction and distillation according to the procedure of Example I, there is obtained an 84% yield of 3-amino-4-methylbenzaldehyde ethylene glycol acetal boiling at 161° at 5 mm. and having the formula:

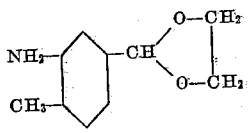

Analysis: calculated for $C_{10}H_{13}O_2N$: $C=67.0$; $H=7.26$; found: $C=67.27\%$; $H=7.37\%$.

Example VI

To 165 parts of the acetal of Example I is added 0.2 parts of sodium hydroxide and the mixture heated to 150° C. The vapor pressure remains unchanged at 3.1 mm. during a period of six hours. In a similar experiment, omitting the sodium hydroxide, the vapor pressure begins to rise after a very short period because of the formation of ethylene glycol.

Although the above methods have been found to be the most practical from ease of operation and yield, other methods may be used for accomplishing these steps. For instance, the acetalization may be carried out by saturating a solution of the nitrobenzaldehyde in the glycol with hydrogen chloride, allowing it to stand for several days, then neutralizing the acid, washing out the excess glycol, and recrystallizing the crude product. Another method involves reaction of the nitroaldehyde with the cyclic sulfite of ethylene glycol $(CH_2O)_2SO$. Also, the dimethyl acetal may be prepared from the nitrobenzaldehyde and methanol or dimethyl sulfite and the resulting dimethyl acetal heated with a glycol in the presence of an acid catalyst to effect acetal interchange. The reduction may be carried out by chemical means, e. g., with sodium or ammonium sulfides or by sodium in alcohol, etc. Although some purification of the final product can be obtained through solvent extracts and washings, the ready distillability of the product makes rectification the simplest and most useful method of purification.

Other acetals that may be prepared by this method include those of the following glycols: 1,2-propylene glycol; 1,2- or 1,3-butylene glycol. Other hydrogenation catalysts that may be used in the reduction can be prepared from ruthenium oxide, palladium, platinum, cobalt, copper chromite, cobalt sulfide, etc. The catalysts may be supported on inert carriers. Other diluents that may be added to the reduction mixture include ethanol, propanol, benzene, toluene, hexane, etc. The reduction is preferably carried out as rapidly as can be done at temperatures below 90° C. Since the reaction is exothermic, this requires efficient agitation and cooling.

Other stabilizers that can be used to prevent the heat decomposition of these acetals include the following: hydroxides, carbonates, oxides, amides, and alkoxides of lithium, sodium and potassium; oxides and hydroxides of calcium, barium, or any other alkaline, inorganic salt of the 1st or 2nd group of the periodic system which forms an aqueous solution having a pH greater than 10. Also useful are nitrogen compounds of the tertiary, i. e., $R_3N$, or quaternary, i. e., $R_4NOH$, classes which form aqueous solutions having a pH of 10 or greater and which are stable and nonvolatile under the distillation conditions used, i. e., temperatures in the range of 120° to 200° C. and pressures of less than 10 mm. R in the formulae may be an alkyl group, such as dodecyl or hexadecyl, or an aralkyl group, such as benzyl.

One of the most important uses of the cyclic aminobenzaldehyde acetals of 1,2- and 1,3-glycols of 2 to 4 carbon atoms is in the preparation of color-forming polyvinyl acetals, especially those difficult to obtain by other methods. Thus, the large class of color formers containing aldehyde reactive groups, i. e., reactive methylene groups, can now be converted to color-forming polyvinyl acetals by use of these new compounds in which the aldehyde group is continually protected from condensation with the dye coupling reactive group of the color former by the acetal grouping. However, the resulting color former readily condenses with polyvinyl alcohol through acetal interchange. Among such active methylene color formers which can now be converted to polyvinyl acetals are the (1) beta-ketoacylamides of the type $RCOCH_2CONHR'$, where R is a hydrocarbon or heterocyclic radical and R' is preferably aromatic, e. g., benzoylacetanilide, stearoylacetanilide, p-acetoacetaminobenzoic acid; (2) pyrazolones, e. g., 1-p-carboxyphenyl-3-methyl-5-pyrazolone, 1-phenyl-3-carboxy-5-pyrazolone; (3) benzyl cyanides; (4) indoxyls and thioindoxyls; (5) homophthalimides; (6) 2,4-dihydroxyquinoline; (7) diketohydrindene; (8) malonamides; (9) phenacylpyridinium halides; (10) hydroxypyridine, etc.

The novel acetals also are valuable for use in preparing dyes for general dye purposes, such as, for textiles, plastics, pigments, etc., or any application where an aldehyde group increases the fastness by reason of its reaction with a high molecular weight component or fiber. Thus, azo dyes may be prepared by diazotization of m-aminobenzaldehyde acetals and coupling with an azo dye-coupled component or preformed azo dye, or the dye may be joined to a m-aminobenzaldehyde acetal through an amide or sulfonamide group. Such dyes are particularly useful with fibers containing hydroxyl, amino, or amide groups with which the acetal group may react under properly controlled conditions. Dyes of this type are exceptionally fast to washing.

As many widely different embodiments of this invention can be made without departing from the spirit and scope thereof, it is to be understood that the invention is not to be limited except as defined by the claims.

What is claimed is:

1. The cyclic aminobenzaldehyde acetals of the formula:

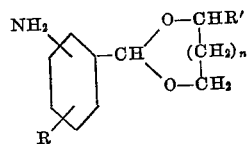

where R is a member taken from the group consisting of hydrogen, methyl, ethyl, phenyl, naphthyl, methoxy, and ethoxy groups, R' is taken from the group consisting of hydrogen and methyl, and $n$ is a cardinal number from 0 to 1.

2. The cyclic acetal of the formula:

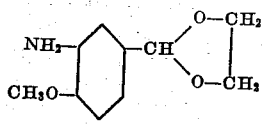

3. The cyclic acetal of the formula:

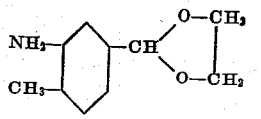

4. The cyclic acetal of the formula:

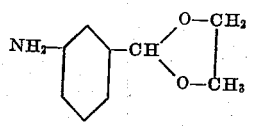

5. The process which comprises catalytically reducing cyclic nitrobenzaldehyde acetals of the formula:

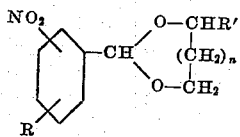

where R is a member taken from the group consisting of hydrogen, methyl, ethyl, phenyl, naphthyl, methoxy, and ethoxy groups, R' is taken from the group consisting of hydrogen and methyl, and $n$ is a cardinal number from 0 to 1 with hydrogen until a cyclic aminobenzaldehyde acetal of an alkylene glycol of 2 to 4 carbon atoms is formed and recovering the latter acetal.

6. The process which comprises catalytically reducing a cyclic nitrobenzaldehyde acetal of the formula:

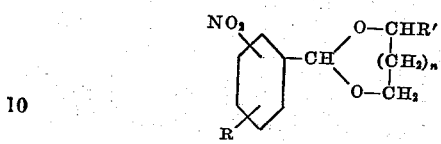

where R is a member taken from the group consisting of hydrogen, methyl, ethyl, phenyl, naphthyl, methoxy, and ethoxy groups, R' is taken from the group consisting of hydrogen and methyl, and $n$ is a cardinal number from 0 to 1 with hydrogen until a cyclic aminobenzaldehyde acetal of an alkylene glycol of 2 to 4 carbon atoms is formed and recovering the latter acetal and distilling the aminobenzaldehyde glycol acetal in the presence of a non-volatile alkali and thereby forming a stabilized aminobenzaldehyde glycol acetal.

DAVID M. McQUEEN.
DAVID W. WOODWARD.

REFERENCES CITED

The following references are of record in the file of this patent:

UNITED STATES PATENTS

| Number | Name | Date |
|---|---|---|
| 2,272,153 | Moyle | Feb. 3, 1942 |
| 2,415,021 | Morey | Jan. 28, 1947 |

OTHER REFERENCES

Chemical Abstracts, vol. 23, 596, 597 (1929).

Certificate of Correction

Patent No. 2,481,434

September 6, 1949

DAVID M. McQUEEN ET AL.

It is hereby certified that errors appear in the printed specification of the above numbered patent requiring correction as follows:

Column 3, line 74, for "8.5" read *8.5%*; column 4, line 59, for "b-nitrobenzaldehyde" read *m-nitrobenzaldehyde*; column 7, lines 16 to 19, for that portion of the formula reading  and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*